Patented Jan. 29, 1924.

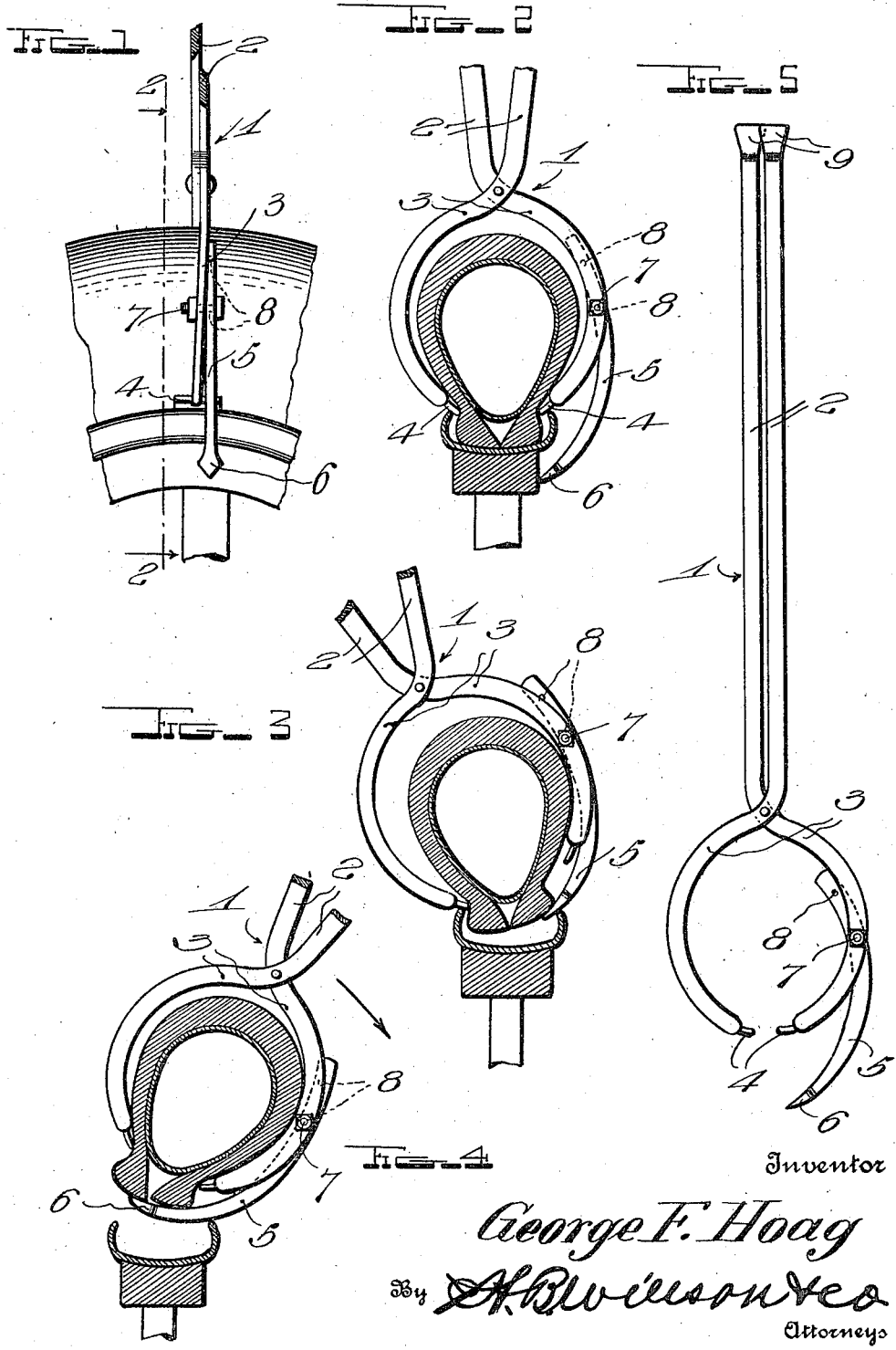

1,482,304

UNITED STATES PATENT OFFICE.

GEORGE F. HOAG, OF SHAVERTOWN, NEW YORK.

TIRE TOOL.

Application filed October 30, 1922. Serial No. 597,893.

*To all whom it may concern:*

Be it known that I, GEORGE F. HOAG, a citizen of the United States, residing at Shavertown, in the county of Delaware and State of New York, have invented certain new and useful Improvements in Tire Tools; and I do declare the following to be a full, clear, and exact description of the invention, such as will enable others skilled in the art to which it appertains to make and use the same.

My invention relates to improvements in tire tools and more particularly to those of the type comprising a pair of tongs with curved jaws for disengaging the tire beads from the rim. It has been quite common heretofore to provide a pair of tongs for prying the tire beads from the rim to such an extent as to permit a tire iron to be inserted beneath said beads for the purpose of prying the tire laterally from the rim and it is the object of my invention to provide an improvement over devices of this character by the provision of a specially constructed tire iron pivoted directly to one jaw of the tongs, so that it may be readily passed under both beads when the latter are pried sufficiently from the rim, by the tongs.

With the foregoing in view, the invention resides in the novel subject matter hereinafter described and claimed, the description being supplemented by the accompanying drawings.

Figure 1 is a fragmentary side elevation of a tire and rim showing the application of my invention.

Figure 2 is a sectional view through the tire and rim indicated by line 2—2 of Figure 1, showing a partial side elevation of the tool.

Figures 3 and 4 are views similar to Figure 2 but illustrating different steps in removing a tire.

Figure 5 is a side elevation of the complete tire tool disengaged from the tire and rim.

In the drawings above briefly described, the numeral 1 designates a pair of tongs provided with crossed handles 2 and curved jaws 3, the latter being intended to extend around a tire in the manner shown in the drawings and being provided with widened terminals 4 to engage the tire beads, so that by proper manipulation of the handles 2, said beads may be forced toward each other in the manner shown in Fig. 2 and then pried to a position such as that which is shown in Fig. 3. In this last named position, a tire iron is inserted beneath both of the beads so that the entire tire may be pried laterally from the rim. The numeral 5 designates the tire iron which I prefer for this purpose, said iron being longitudinally curved in the manner shown and being widened and pointed at its end as indicated at 6. I pivot the iron 5 to one of the jaws 3 so that it may readily be swung into position as shown in Fig. 3, for insertion beneath both of the beads of the tire as seen in Fig. 4. It will then be seen that the tire may readily be pried laterally from the rim. In applying the tire to the rim, a reversal of the operation above set forth, will of course be effected.

By employing the construction shown or an equivalent arrangement, a tire tool is provided which will be simple and inexpensive, yet highly efficient and desirable, and since good results may be obtained from the details disclosed, they may well be followed, but within the scope of the invention as claimed, numerous minor changes may of course be made.

It may be added that the pivot 7 is preferably in the form of a bolt and that the tire iron 5 may be provided with a plurality of openings 8, through any one of which the bolt may be passed, whereby the iron 5 may be adjusted to project a greater or lesser distance beyond its carrying jaw, according to the size of the tire to be removed or applied. Also, the ends of the handles 2 are preferably flattened as indicated at 9 for use as an ordinary tire iron if desired.

It may furthermore be stated that although I have used the term "tire iron" to apply to part 5, it should be understood that this part is not necessarily constructed of iron, but may be of any desired material.

I claim:

1. A tire removing tool comprising tongs having curved jaws to embrace the tire and pry its beads from their retaining rim, and a tire iron insertable under both beads for prying the tire laterally from the rim, said tire iron being pivoted to one of said jaws.

2. A tire removing tool comprising tongs having curved jaws to embrace the tire and pry its beads from their retaining rim, and a longitudinally curved tire iron pivoted near one end to one of said jaws and extending beyond this jaw at its free end, the latter being flattened for passage between the tire beads and the wheel rim.

In testimony whereof I have hereunto affixed my signature.

GEORGE F. HOAG.